United States Patent
Alfano et al.

(10) Patent No.: US 9,876,904 B2
(45) Date of Patent: Jan. 23, 2018

(54) METHOD AND SYSTEM FOR COMMUNICATING AND DISPLAYING DATA WITH A VOICE CALL

(71) Applicant: BlackBerry Limited, Waterloo (CA)

(72) Inventors: Nicholas Patrick Alfano, Vancouver (CA); William David Castell, Waterloo (CA); David Lloyd Heit, Waterloo (CA); Douglas Michael Gisby, Highland Park, IL (US); Jan Hendrik Lucas Bakker, Keller, TX (US); Richard John George, Waterloo (CA); Ian James McDonald, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/130,487

(22) Filed: Apr. 15, 2016

(65) Prior Publication Data

US 2016/0234381 A1     Aug. 11, 2016

Related U.S. Application Data

(63) Continuation of application No. 11/837,030, filed on Aug. 10, 2007.

(Continued)

(51) Int. Cl.
*H04M 3/42* (2006.01)
*H04M 3/02* (2006.01)
(Continued)

(52) U.S. Cl.
CPC ............. *H04M 3/42042* (2013.01); *H04M 1/274508* (2013.01); *H04M 1/575* (2013.01);
(Continued)

(58) Field of Classification Search
CPC combination set(s) only.
See application file for complete search history.

(56) References Cited

U.S. PATENT DOCUMENTS 5,724,412 A * 3/1998 Srinivasan .............. H04L 29/06
379/142.01
6,310,944 B1 * 10/2001 Brisebois .......... H04M 3/42042
379/142.01

(Continued)

FOREIGN PATENT DOCUMENTS

EP          0 802 661      10/1997
WO          02/17602       2/2002

OTHER PUBLICATIONS

Office Action; CA application No. 2630377; Aug. 29, 2011.
Office Action; CA application No. 2630377; Jun. 25, 2013.
Office Action; CA application No. 2630377; May 31, 2012.

*Primary Examiner* — Duc Nguyen
*Assistant Examiner* — Assad Mohammed
(74) *Attorney, Agent, or Firm* — Ridout and Maybee LLP

(57) ABSTRACT

A method of communicating information describing a voice call from a caller device to a recipient device. Call subject information describing the call is obtained from the caller device and sent to the recipient device to inform the recipient about the subject of the call. The call subject information is can be presented as a subject line displayed to on the recipient device to inform the recipient about the nature of the call and/or its urgency, thereby enabling the recipient to better determined whether to answer the call. The call subject information can be input by the caller or extracted automatically from an application from which the call was initiated.

8 Claims, 14 Drawing Sheets

Related U.S. Application Data

(60) Provisional application No. 60/915,298, filed on May 1, 2007.

(51) Int. Cl.
  H04M 3/436 (2006.01)
  H04M 1/2745 (2006.01)
  H04M 1/57 (2006.01)
  H04M 1/725 (2006.01)
  H04M 7/00 (2006.01)
  H04W 4/16 (2009.01)
  H04W 4/20 (2009.01)

(52) U.S. Cl.
  CPC ......... H04M 1/72552 (2013.01); H04M 3/02 (2013.01); H04M 3/436 (2013.01); H04M 7/0042 (2013.01); H04M 7/0054 (2013.01); H04M 3/42059 (2013.01); H04M 2201/38 (2013.01); H04M 2203/2011 (2013.01); H04M 2203/2038 (2013.01); H04M 2203/654 (2013.01); H04W 4/16 (2013.01); H04W 4/20 (2013.01)

(56) References Cited

U.S. PATENT DOCUMENTS

| | | |
|---|---|---|
| 6,665,378 B1 | 12/2003 | Spielman et al. |
| 6,677,903 B2 | 1/2004 | Wang |
| 6,798,767 B1 | 9/2004 | Alexander et al. |
| 6,865,266 B1 | 3/2005 | Pershan |
| 6,954,781 B2* | 10/2005 | Bhattacharya .......... H04M 3/53 379/88.14 |
| 6,977,993 B2 | 12/2005 | Starbuck |
| 6,993,360 B2* | 1/2006 | Plahte ............... H04M 1/72519 455/554.1 |
| 7,106,851 B2* | 9/2006 | Tang .................... H04M 1/2473 379/355.01 |
| 7,236,472 B2 | 6/2007 | Lazaridis et al. |
| 7,551,899 B1* | 6/2009 | Nicolas ........... H04M 1/274558 379/355.01 |
| 7,623,643 B2* | 11/2009 | Raghav ................. H04M 1/575 379/201.01 |
| 2002/0077086 A1 | 6/2002 | Tuomela et al. |
| 2002/0128036 A1* | 9/2002 | Yach ..................... H04M 1/725 455/552.1 |
| 2003/0208358 A1* | 11/2003 | Andaker ............... H04M 7/003 704/270.1 |
| 2004/0120498 A1 | 6/2004 | Sylvian |
| 2004/0198427 A1* | 10/2004 | Kimbell ................ H04M 1/663 455/556.1 |
| 2004/0208301 A1 | 10/2004 | Urban et al. |
| 2004/0242212 A1 | 12/2004 | Bacon et al. |
| 2005/0005014 A1 | 1/2005 | Holmes et al. |
| 2005/0025090 A1 | 2/2005 | Klein |
| 2005/0143103 A1* | 6/2005 | Bjorgan ............. H04M 3/42051 455/466 |
| 2005/0243982 A1* | 11/2005 | Starbuck ............. H04M 1/2478 379/88.23 |
| 2006/0003783 A1* | 1/2006 | Fukui ..................... H04W 4/10 455/517 |
| 2006/0025112 A1* | 2/2006 | Hamanaga .............. H04M 1/56 455/412.1 |
| 2007/0047726 A1 | 3/2007 | Jabbour |
| 2007/0073810 A1 | 3/2007 | Adams |
| 2007/0153716 A1 | 7/2007 | Fukuzawa |
| 2007/0263853 A1* | 11/2007 | Pearson ............. H04M 1/2745 379/413.03 |
| 2008/0069312 A1* | 3/2008 | Narang ................... H04M 3/53 379/88.12 |
| 2008/0189159 A1* | 8/2008 | Jain ..................... G06Q 10/109 705/7.18 |
| 2008/0263158 A1 | 10/2008 | Del Cacho |

* cited by examiner

| Appointment Details | |
|---|---|
| Subject Test Meeting | |
| Location: Moonraker Room | |
| 📅 All Day Event | |
| Start: | Tue, Jan 9, 2007 11:00 AM |
| End: | Tue, Jan 9, 2007 12:00 PM |
| Duration: | 1 Hour 0 Mins |
| Time Zone: | Eastern Time (-5) |
| Show Time As: | Busy |
| Reminder: | None |
| Invited: | Jay Synth |
| Recurrence: | None |
| No Recurrence. | |
| 📅 Mark as Private | ▽ |

*FIG. 7*

METHOD AND SYSTEM FOR COMMUNICATING AND DISPLAYING DATA WITH A VOICE CALL

CROSS-REFERENCE TO RELATED APPLICATIONS

This application is a continuation of U.S. patent application Ser. No. 11/837,030, filed Aug. 10, 2007, which claims priority to U.S. provisional patent application No. 60/915,298, filed May 1, 2007, the content of both documents being incorporated herein by reference.

TECHNICAL FIELD

The present disclosure relates generally to wireless communications devices and, in particular, to techniques for communicating and/or displaying information regarding a voice call that is transmitted or received by a wireless communications device.

BACKGROUND

Wireless communications devices such as the BlackBerry® by Research in Motion Limited enable users to communicate by placing voice calls or by sending text-based messages (e.g. e-mail, SMS, MMS, etc.).

When receiving a voice call, the device may display the caller's name and number provided the device is enabled with "Caller ID" or "Call Display" technology (and provided, of course, that the caller hasn't squelched his identity using "Call Block" or by using a private number which results in the display merely showing "Private Number" or "Unknown Number"). When a recipient receives an incoming call, therefore, the only form of caller identification is the caller's phone number and either the person's name or the company's name. If only the caller's number is displayed, then additional information about the caller can potentially be obtained by attempting to correlate the number of the incoming call with known numbers stored in the device's address book. In many cases, the amount of information available to call recipient is quite limited.

BRIEF DESCRIPTION OF THE DRAWINGS

Further features and advantages of the present disclosure will become apparent from the following detailed description, taken in combination with the appended drawings, in which:

FIG. 7 is a screenshot of an example of a meeting request screen from which a call can be placed;

It will be noted that throughout the appended drawings, like features are identified by like reference numerals.

DETAILED DESCRIPTION

Figure 1:
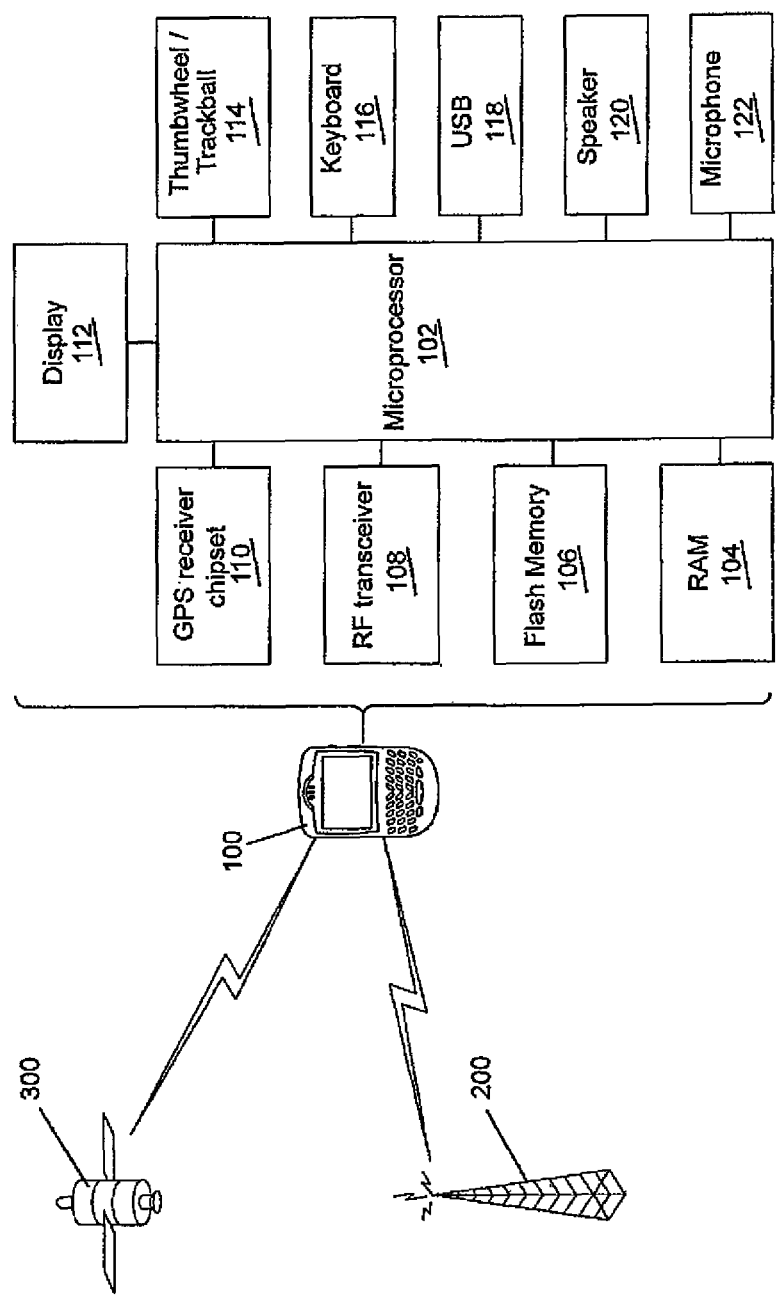
FIG. 1 is a block diagram of key components of a wireless communications system on which the present disclosure can be implemented.

Given today's hectic work environment, certain calls (even from known callers) might have to be ignored if the receiver is too busy to answer, in a meeting, or otherwise occupied. However, it would be very useful to enable the caller to provide further information to the recipient about the call so that the recipient could make a more informed decision about whether to answer the call.

The present disclosure provides a solution to the problem set forth above by enabling a user to enter textual information in a call subject line that would be pushed to the recipient for displaying in an incoming call screen so as to provide additional information to the recipient regarding the context of the call and/or to signify the importance/priority of the call.

In accordance with one aspect of the present disclosure, there is provided a method of communicating information describing a voice call from a caller to a recipient. The method includes steps of obtaining call subject information describing the call and communicating the call subject information to the recipient to inform the recipient about the call.

In accordance with another aspect of the present disclosure, there is provided a method of displaying call information about an incoming voice call. The method includes steps of receiving call subject data associated with the incoming voice call, processing the call subject data to obtain call subject information describing the incoming call, and displaying the call subject information to a recipient of the incoming voice call to inform the recipient about the nature of the incoming call.

In accordance with a further aspect of the present disclosure, there is provided a method of establishing a voice call between a caller device and a recipient device, wherein the caller device and the recipient device are connected via a voice channel and a data channel, the method comprising: displaying on a display of the caller device a calling screen for initiating the voice call, the calling screen including a number field to receive a telephone number to be called and the calling screen including a call subject field to receive call subject information; in response to receipt of call subject information in the call subject field of the calling screen and in response to receipt of an input to initiate the voice call, extracting the call subject information from the call subject field; encoding the call subject information as call subject data, the call subject data including an identifier identifying the call subject data; transmitting the call subject data to the recipient device over the data channel between the caller device and the recipient device; attempting to establish the voice call between the caller device and the recipient device over the voice channel between the caller device and the recipient device approximately contemporaneously with transmitting the call subject data to the recipient device; and displaying a connected call screen on the display of the caller device in response to the voice call being established, the connected call screen including a status notification indicating that the voice call was established, recipient information including the telephone number and the call subject information.

In accordance with a further aspect of the present disclosure, there is provided a method of establishing a voice call between a caller device and a recipient device, wherein the caller device and the recipient device are connected via a voice channel and a data channel, the method comprising: displaying on a display of the caller device a user interface screen of an application, the user interface screen including a name field including a contact name and a subject field including a subject; in response to receiving input to initiate the voice call while the contact name in the contact field is selected, determining a telephone number to be called in accordance with the selected contact name from an address book stored on the caller device; extracting call subject information from the subject in the subject field of the user interface screen; displaying on the display of the caller device a calling screen for initiating the voice call, the calling screen including a number field including the telephone number to be called and a call subject field including the call subject information; encoding the call subject information as call subject data, the call subject data including an identifier identifying the call subject data; transmitting the call subject data to the recipient device over the data channel between the caller device and the recipient device; attempting to establish the voice call between the caller device and the recipient device over the voice channel between the caller device and the recipient device approximately contemporaneously with transmitting the call subject data to the recipient device; and displaying a connected call screen on the display of the caller device in response to the voice call being established, the connected call screen including a status notification indicating that the voice call was established, recipient information including the telephone number and the call subject information.

In accordance with a further aspect of the present disclosure, there is provided a method of establishing a voice call between a caller device and a recipient device, wherein the caller device and the recipient device are connected via a voice channel and a data channel, the method comprising: receiving call subject data from a caller device over the data channel between the caller device and the recipient device, the call subject data including an identifier identifying the call subject data; receiving an incoming call from the caller device over the voice channel between the caller device and the recipient device approximately contemporaneously with receiving the call subject data from the caller device; identifying the call subject data in accordance with the identifier in the call subject data; extracting call subject information from the call subject data; displaying an incoming call screen on a display of the recipient device, the incoming call screen including a status notification indicating an incoming call, caller information and the call subject information; and displaying a connected call screen on the display of the recipient device in response to the voice call being established, the connected call screen including a status notification indicating that the voice call was established, the caller information and the call subject information.

In accordance with a further aspect of the present disclosure, there is provided a method of establishing a voice call between a caller device and a recipient device, wherein the caller device and the recipient device are connected via a voice channel and a data channel, the method comprising: receiving an incoming call from a caller device over the voice channel between the caller device and the recipient device; determining whether call subject information is available; when call subject information is available, displaying an incoming call screen on a display of the recipient device, the connected call screen including a status notification indicating that the presence of the incoming call, caller information and the call subject information; and displaying a connected call screen on the display of the recipient device in response to the voice call being established, the connected call screen including a status notification indicating that the voice call was established, the caller information and the call subject information; when call subject information is not available, displaying an incoming call screen on the display of the recipient device, the connected call screen including a status notification indicating that the presence of the incoming call and the caller information; and displaying a connected call screen on the display of the recipient device in response to the voice call being established, the connected call screen including a status notification indicating that the voice call was established and the caller information.

In accordance with further aspects of the present disclosure, there is provided a non-transitory machine readable medium having tangibly stored thereon executable instructions for execution by a processor of an electronic device, wherein the executable instructions, when executed by the processor of the electronic device, cause the processor to the methods described herein.

In accordance with further aspects of the present disclosure, there is provided a wireless communications device, comprising a memory and a processor, wherein the memory has tangibly stored thereon executable instructions for execution by the processor, wherein the executable instructions, when executed by the processor of the electronic device, cause the processor to the methods described herein.

In accordance with a further aspect of the present disclosure, there is provided a wireless communications device having an input device for initiating a voice call, a processor coupled to memory to generate call subject information describing the call, and a radiofrequency transceiver for communicating the call subject information to the recipient to inform the recipient about the call.

In accordance with a further aspect of the present disclosure, there is provided a wireless communications device for displaying call information about an incoming voice call. The device includes a radio frequency transceiver for receiving call subject data associated with the incoming voice call, a processor coupled to memory for processing the call subject data to obtain call subject information describing the incoming call, and a display for displaying the call subject information to a recipient of the incoming voice call to inform the recipient about the nature of the incoming call.

In accordance with a further aspect of the present disclosure, there is provided a server for dispatching call subject information to a recipient describing a voice call initiated by a caller to the recipient. The server includes a data port for receiving call subject data to be dispatched to the recipient, and a processor for determining a routing address for the recipient for dispatching the call subject data to the routing address of the recipient to inform the recipient about the call.

The details and particulars of these aspects of the technology will now be described below, by way of example, with reference to the attached drawings.

FIG. 1 is a block diagram of key components of a wireless communications system for implementing the present disclosure. It should be expressly understood that this figure is intentionally simplified to show only certain components; the system, map server and wireless communication device of course each include other components beyond those shown in FIG. 1.

As depicted in FIG. 1, the system includes a wireless communications device 100 that has a microprocessor 102 (or simply a "processor") which interacts with memory in the form of RAM 104 and flash memory 106, as is well known in the art. The device 100 includes an RF (radiofrequency) transceiver 108 for communicating wirelessly with one or more base stations 200 connected via a wireless network to the Internet 210 to enable e-mail and Web browsing, for example. The device 100 may optionally include a GPS (Global Positioning System) receiver chipset 110 for receiving GPS radio signals transmitted from one or more orbiting GPS satellites 300. In terms of input/output devices or user interfaces (UI), the device 100 typically includes a display 112 (e.g. a small LCD screen), a thumbwheel and/or trackball 114, a keyboard or keypad 116, a USB 118 or serial port for connecting to peripheral equipment, a speaker 120 and a microphone 122. The processor and memory thus enable a variety of applications (messaging, calendaring, etc.) to run on the wireless device. The speaker 120, microphone 122 and RF transceiver circuitry 108 form part of a voice communication subsystem that enables cellular communication for placing or receiving voice calls.

Figure 2:
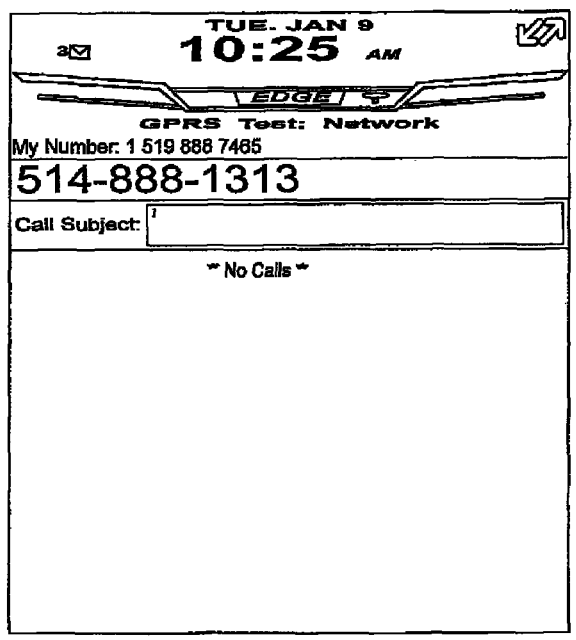
FIG. 2 is a screenshot of an example of a call setup screen.

FIG. 2 is a screenshot of an example of a call setup screen. A "call subject" line feature in accordance with the present disclosure enables a caller to enter "call subject information" into an alphanumeric edit control in the call user interface (UI) of the device while setting up a call, as shown in the call setup example presented in FIG. 2.

In the example presented in FIG. 2, the "Call Subject:" text input field prompts the caller to enter alphanumeric text to describe the subject or topic of the call that will then be transmitted to the call recipient when placing the call. The text field can accept an entry of a system-configurable character length.

Figure 3:
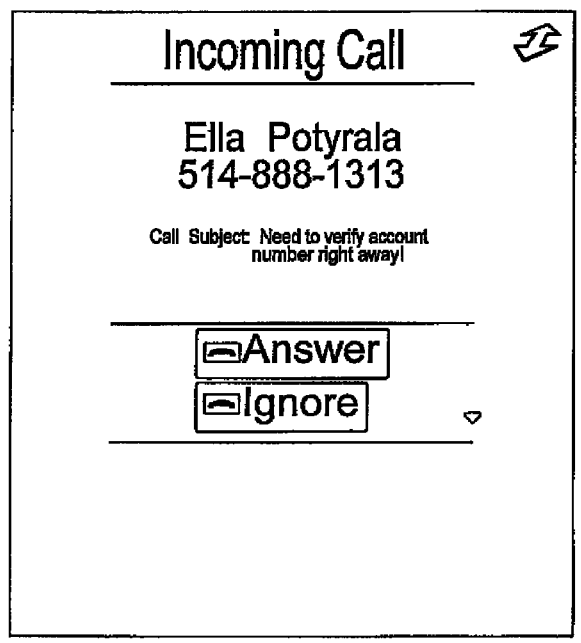
FIG. 3 is a screenshot of an example of an incoming call screen.

When the recipient receives a call from the caller, an "Incoming Call" screen may be displayed on the device as shown in FIG. 3, which presents one example of an incoming call screen in accordance with this technology. Displaying this incoming call screen to the call recipient enables the latter to read the subject or the topic of the call as shown in the example presented in FIG. 3. In this particular example, the call subject line reads "Call Subject: Need to verify account number right away!". This call subject information therefore provides the recipient with additional information about the nature of the call to enable the call recipient to judge or decide whether to accept the call or not at that time. In this particular example, the incoming call screen shows the name of the caller, her telephone number and an Answer/Ignore pop-up box for enabling the user of the device (the intended recipient of the caller's call) to either answer the call or to ignore it. This call subject information is thus information that is additional to the caller's name and telephone number. It should be appreciated that the user can enter any text even if it is, in fact, unrelated to the subject or topic of the call. It should also be appreciated that the prefatory words "Call Subject:" could be suppressed to provide more text space for slightly longer messages. Again, the user could configure the device to either display the prefatory words "Call Subject:" (or an equivalent phrase) or to suppress these prefatory words altogether.

Figure 4:
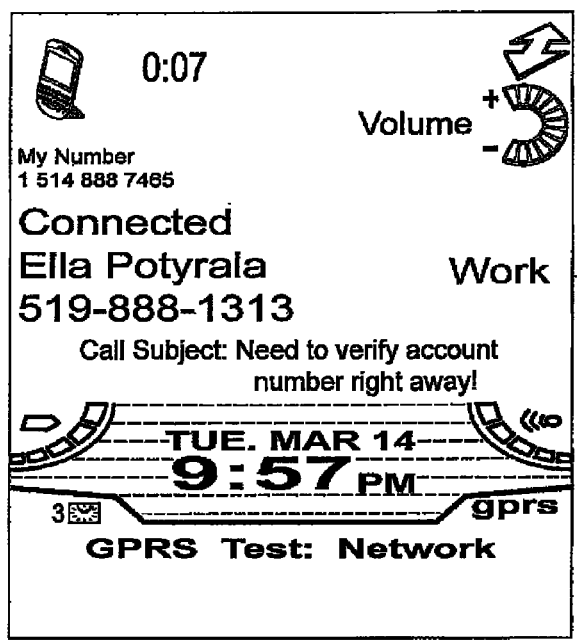
FIG. 4 is a screenshot of an example of a connected call screen.

If the user chooses to answer the call, a "call connected" screen may be displayed. An example of a "call connected" screen is presented in FIG. 4. As shown in this particular example, the call subject information ("Need to verify account number right away!") may remain on the display or, alternatively, may be made to disappear once the call is answered. Whether the call subject information persists or is suppressed once the call is answered may be a user-configurable option or setting.

From the foregoing, it should be understood that this novel method of communicating information describing a voice call from a caller to a recipient entails steps of obtaining call subject information describing the call and then communicating the call subject information to the recipient to inform the recipient about the call. Obtaining the call subject information can be accomplished by prompting the caller to input text describing the call (as described and illustrated above). Alternatively, though, the step of obtaining call subject information may be achieved by automatically extracting contextual call subject information from an application executing on the device. For example, automatically extracting contextual call subject information can entail extracting meeting information from a calendar application or extracting subject information from a messaging application, such as email or instant messenger, or from any other application from which contextual call information can be extracted.

In one example, the present disclosure enables the caller to auto-populate the "Call Subject" line based on the current device application context. The "application context" means the applications from within which the call is initiated. For example, where the call is initiated from within a calendar application or a messaging application, then the device extracts subject information automatically to auto-populate the call subject line. Although calendar and messaging applications are described by way of examples, the auto-population of call subject line can also be done with other applications that contain relevant call subject information.

Figure 5:
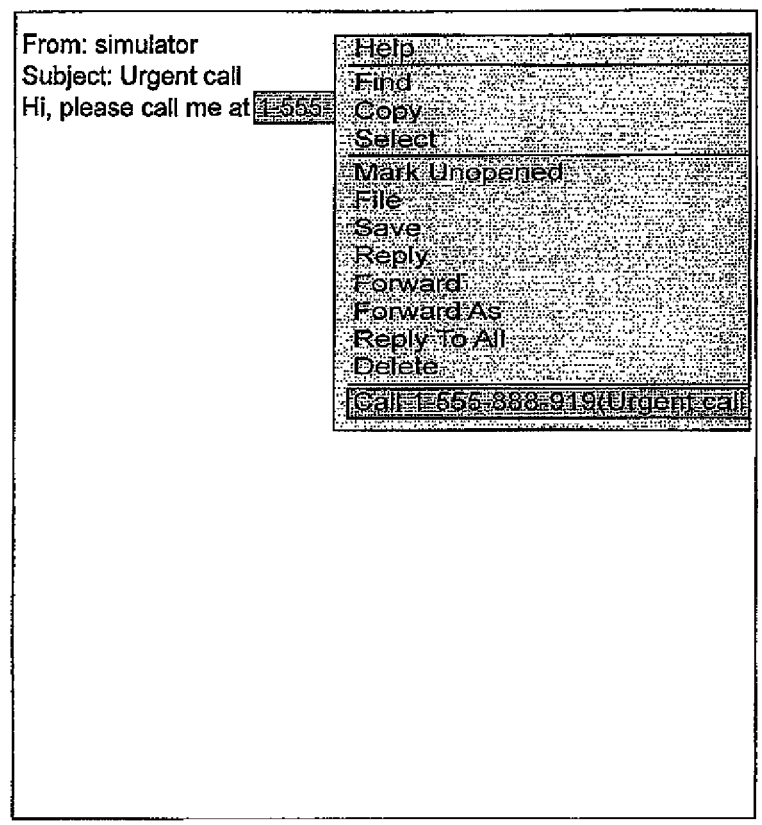
FIG. 5 is a screenshot of an example of a drop-down menu for placing a call from within an e-mail message.

With reference now to FIG. 5, a caller can use information contained within an open message in a messaging application to auto-populate the call subject line. For example, from within a messaging application, the caller can scroll through the message body and any phone number entries found will be highlighted to enable the user to place a call to the highlighted number through the menu entry "Call xxx-xxx-xxxx". The present disclosure thus enables a caller to place a call to the highlighted number with the current message subject line as the "Call subject" through the selection of the additional menu entry "Call xxx-xxx-xxxx (call subject)" as shown in FIG. 5.

Figure 6:
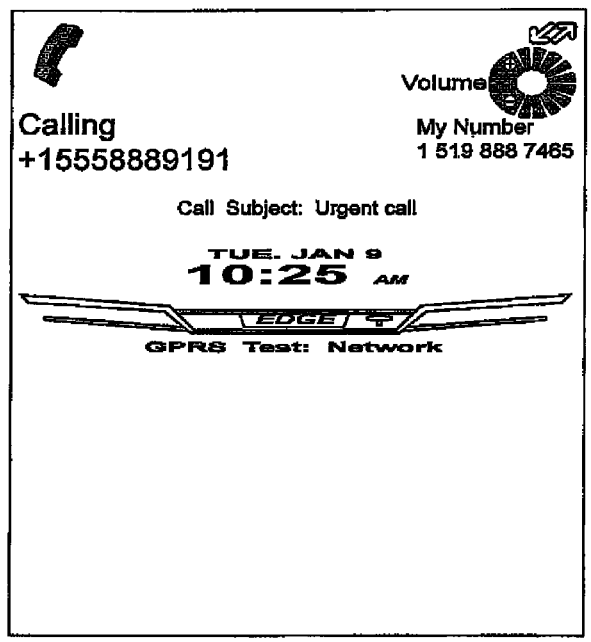
FIG. 6 is a screenshot of an example of an incoming call originating from a messaging application.

FIG. 6 is a screenshot of an example of an incoming call originating from a messaging application. The call recipient will see the "Incoming Call" screen displayed on their device as shown in FIG. 6 with the "Call Subject" field populated by the e-mail message subject (e.g. "Call Subject: Urgent call").

FIG. 7 is a screenshot of an example of a meeting request screen from which a call can be placed. In other words, from the "Calendar" application the user can open a meeting request and scroll down to the "Invited" list, and select an invitee to call, as shown in FIG. 7. Placing a call from within a meeting request can be useful if trying to make last-minute arrangements with an invitee who may be busy preparing for the meeting (and who might only want to be disturbed if he knows it has something to do with the upcoming meeting).

As shown in FIG. 7, when the invitee name is highlighted a menu can then be invoked with a menu item to "Call (selected invitee)".

Figure 8:
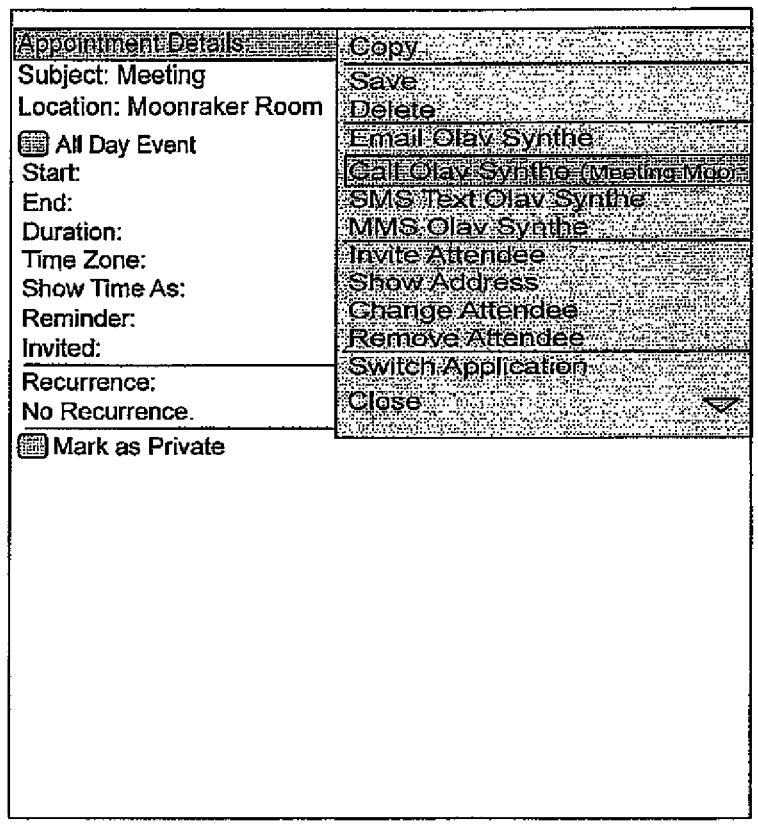
FIG. 8 is a screenshot of an example of a pull-down menu for originating a call from within a meeting request.
Figure 9:
FIG. 9 is a screenshot of an example of an incoming call originating from a meeting request.

FIG. 8 is a screenshot of an example of a pull-down menu for originating a call from within a meeting request or calendar entry in a calendar application. As depicted in FIG. 8, the present disclosure enables the caller to place a call where the meeting entry "Subject" and "Location" and timestamp are included as the "Call subject". The device can be configured to auto-populate all or a subset of these data entries (such as subject and location only or location and timestamp only or subject and timestamp only). As shown in FIG. 8, the technology allows for a call to be placed through an additional menu entry "Call (invitee) with meeting subject/location/timestamp". The call recipient will see the "Incoming Call" screen displayed as shown by way of example in FIG. 9. In the particular example presented in FIG. 9, the incoming call is originating from a meeting request and the call subject line has been auto-populated with the meeting time (e.g. "Meeting 1 pm-2 pm") and the meeting location (e.g. "Location Moonraker Room") which is all data extracted from the meeting request.

Figure 10:
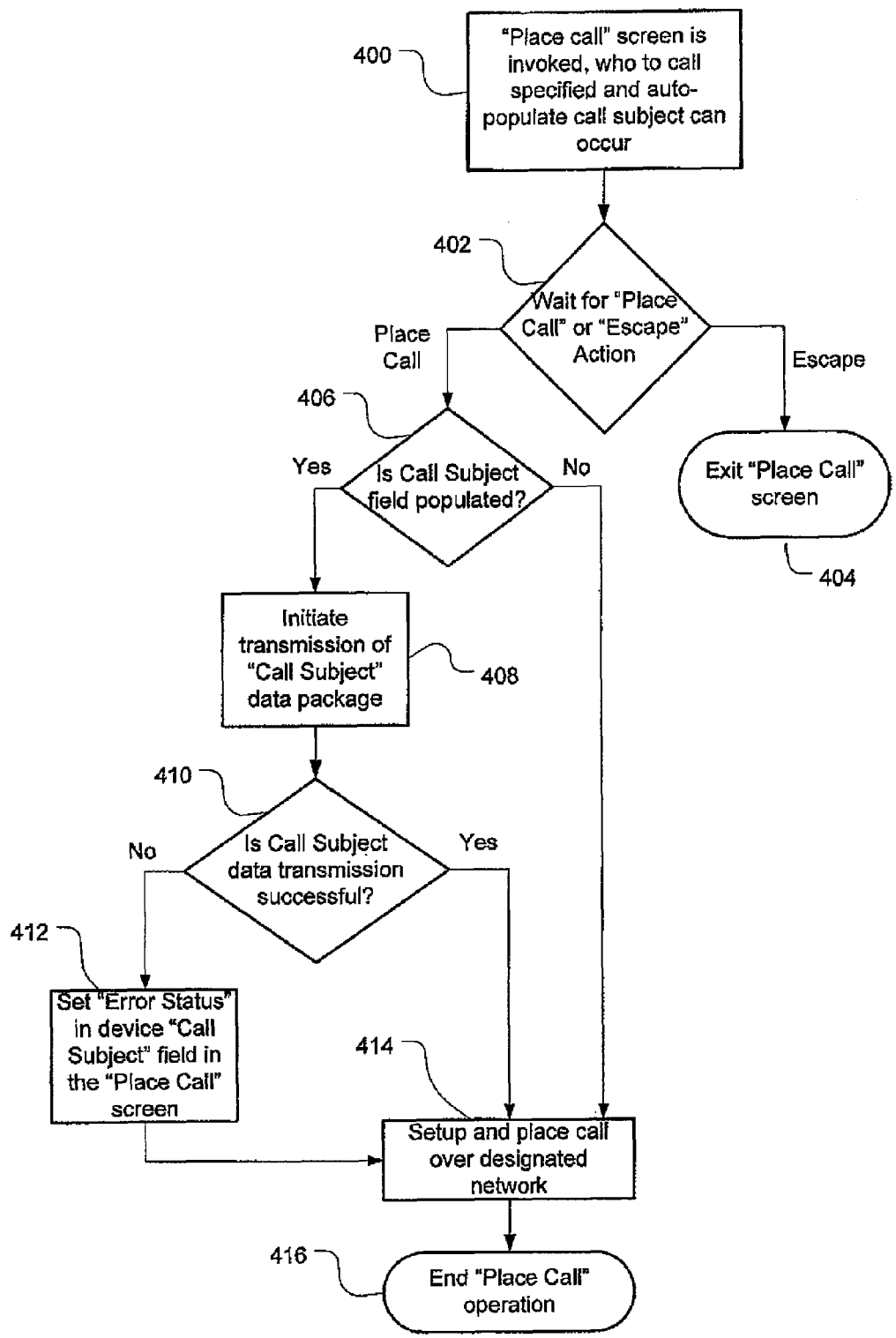
FIG. 10 is a flowchart showing steps of setting up a call using the present disclosure.

FIG. 10 is a flowchart showing steps of setting up a call using the present disclosure. First, a "Place Call" screen is invoked at step 400 by the user on the device, and the user can select whom to call by either entering a number or selecting a call recipient from, for example, an entry in an address book, an email in a messaging application, a meeting request or entry in a calendar application, or any other means on the device. The "call subject" field can now be populated by the device's user if this is desired.

At step 402, the device determines whether the user wishes to place the call ("Place Call"), or whether the user chooses to exit the "Place Call" screen. If the user chooses to exit the "Place Call" screen (step 404), the user is returned to a previous screen (e.g. back to an application context from which the aborted call was initiated).

If the user has chosen to place the call, then the device will determine if the "call subject" entry field is populated (step 406) either by user data entry or by application-context-specific auto-population of the call subject field. It should be noted that, as an optional feature, the user may be allowed to edit the auto-populated subject field (i.e. engage in "post-user editing") to customize or edit the call subject information.

At step 408, transmission of the "call subject" data package is initiated. At step 410, the device then determines whether the "call subject" data transmission was successful within the appropriate time frame. In other words, the device determines if no response is received within the appropriate time frame or if an error status is received.

If the call subject data transmission is not successful, the device (at step 412) updates the "Call Subject" text field in the "Calling/Call Connected" screen with the error status code including transmission time-out response for the "call subject" data package.

If the call subject data transmission is successful, the call is set up and placed over the appropriate network, at step 414, and then the Place Call operation ends (step 416).

Figure 11:
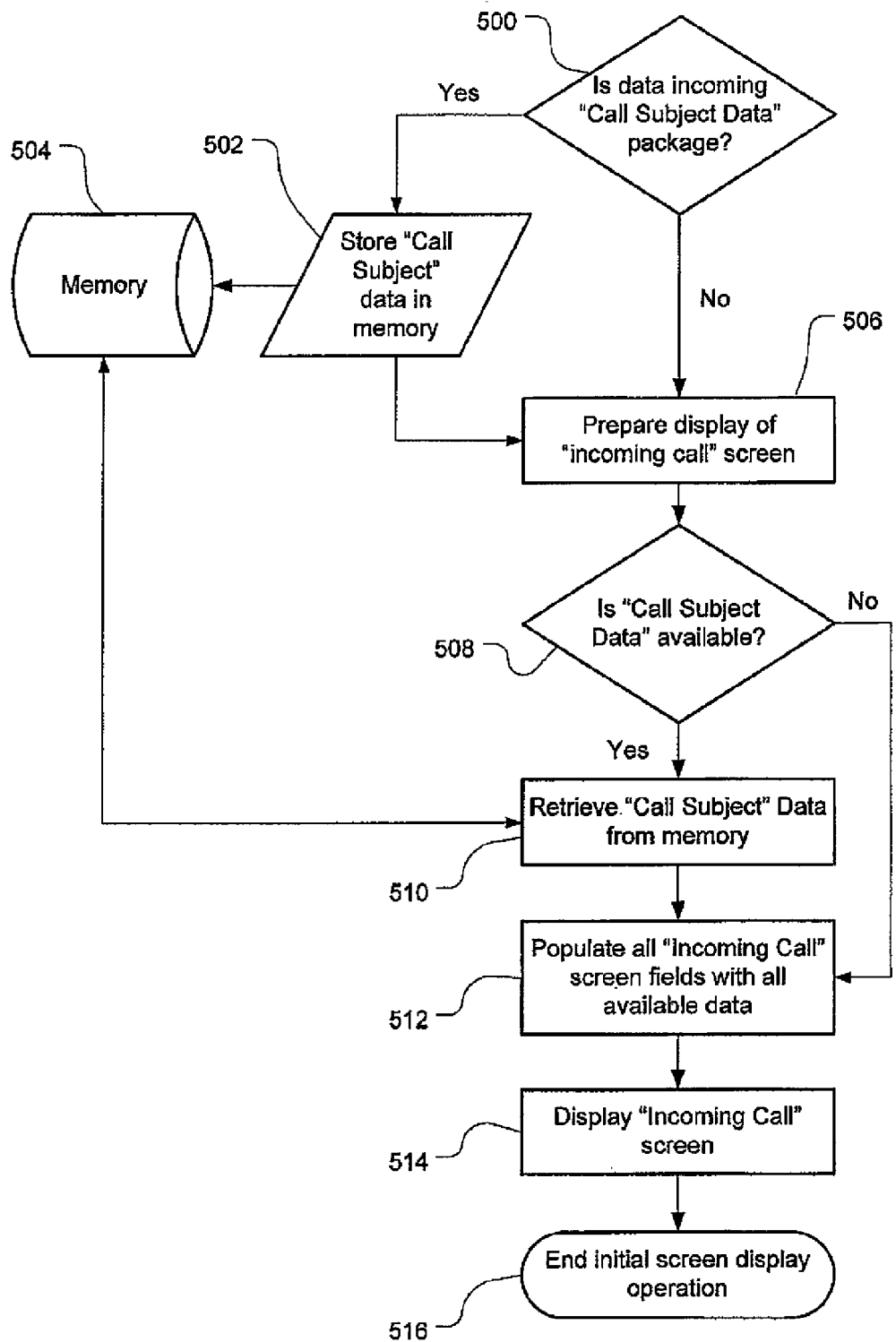
FIG. 11 is a flowchart showing steps of displaying subject line information for an incoming call.

FIG. 11 is a flowchart showing steps of displaying subject line information for an incoming call. As an initial step 500, the device determines if it recognizes the incoming data as being call subject data.

If the incoming data package (or received data package) is marked or otherwise identifiable as a "call subject" data package, then call subject data is stored (step 502) by committing the call subject data to a device memory (designated by reference numeral 504, but which may simply be a memory portion of the device's RAM 104 or flash memory 106 which were introduced with reference to FIG. 1). If not, at step 506, the device prepares an initial display of the "Incoming Call" screen by, for example, presenting only the telephone number of the incoming voice call and/or the name or organization associated with the telephone number.

At step 508, the device determines whether call subject data is available. If "call subject" data is available, then the device retrieves (step 510) the "call subject" data from the device memory 504 and populates (step 512) all the fields of the incoming call screen. If no call subject data is available, then the device populates all "Incoming Call" data fields with whatever data is available, e.g. just the telephone number and name.

As further shown in the flowchart of FIG. 11, the device then displays the "Incoming Call" screen, at step 514, to present the call subject information to the recipient of the call and then (at step 516) ends the initial screen display operation.

Figure 12:
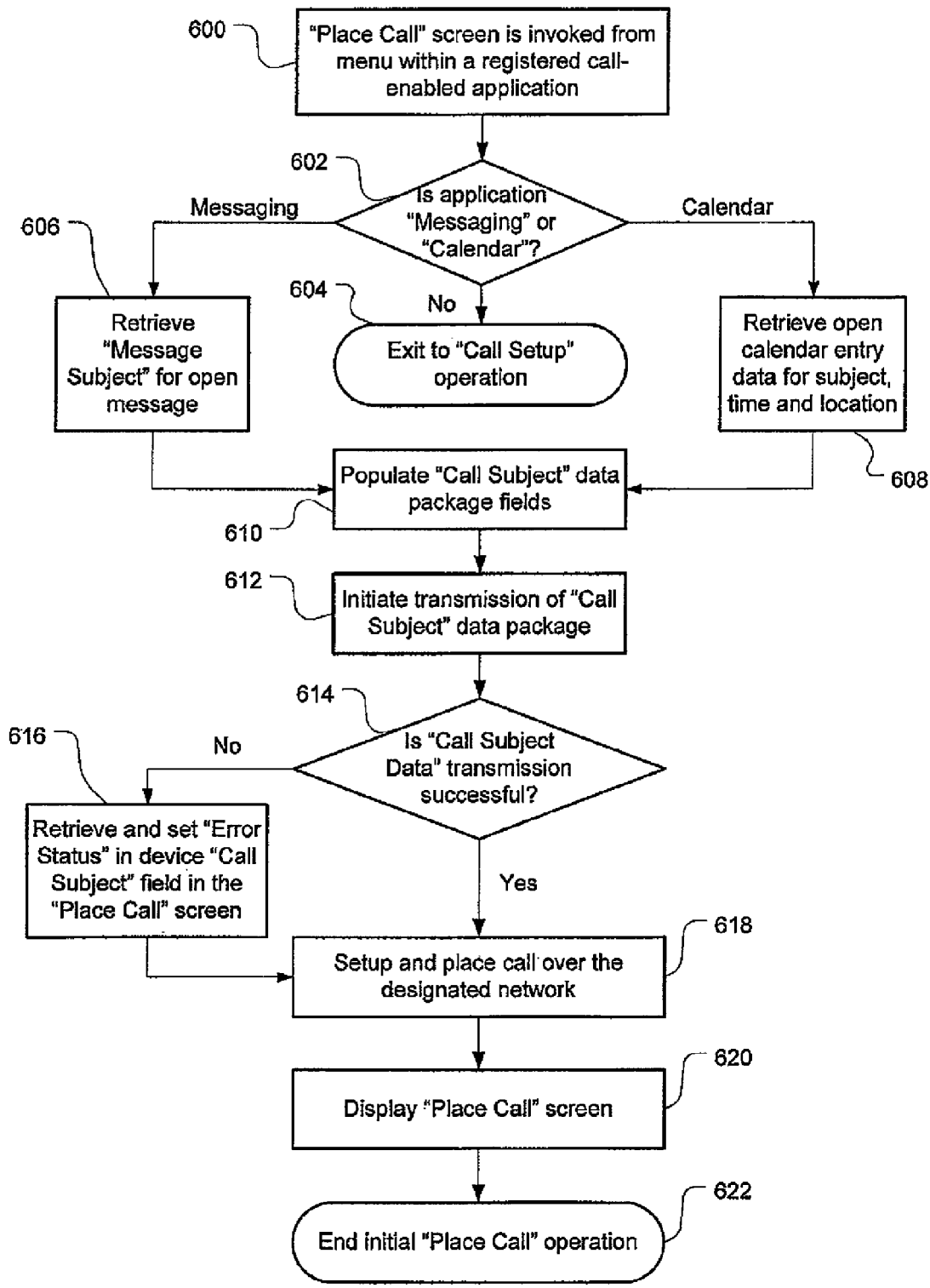
FIG. 12 is a flowchart showing steps of setting up a call by auto-populating a call subject field based on application context.

FIG. 12 is a flowchart showing steps of setting up a call by auto-populating a call subject field based on application context.

As an initial step 600, a "Place Call" screen is invoked from within a call-enabled device application, e.g. a messaging application or a calendar application. In this particular implementation of the technology, the device then determines (step 602) whether the invoking application is "Messaging" or if the invoking application is "Calendar". If it is neither application, in this particular implementation of the technology, the call subject population operation is terminated (Step 604) and regular call setup proceeds.

If the invoking application is "Messaging", the device retrieves the message subject from a currently open message at step 606. Alternatively, if the invoking application is "Calendar", the device retrieves the calendar entries for appointment timestamp, subject and location (or optionally a subset thereof), at step 608.

Regardless whether the invoking application is "Messaging" or "Calendar", the device then auto-populates (step 610) the appropriate data fields in the "call subject" data package based on the invoking application from within which the call has been initiated. In the subsequent step (step 612), transmission of the "call subject" data package is initiated.

At step 614, the device then determines if the "call subject" data transmission is successful within the appropriate time frame. If no response is received within the appropriate time frame or an error status is received (step 616), then the device updates the "call subject" text field for the "Calling/Call Connected" screen with the error status code including transmission time out response for the "call subject" data package.

On the other hand, at step 618, if the transmission of the call subject data package was successful, the call is set up and placed over the appropriate network (by displaying the "Place Call" screen at step 620). At step 620, the initial "Place Call" operation thus ends.

Figure 13:
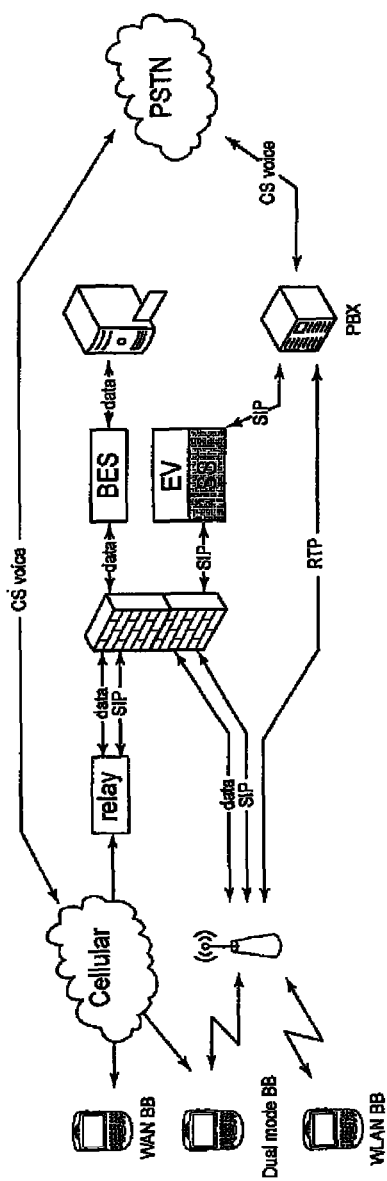
FIG. 13 is a schematic depiction of a wireless communications system for implementing the present disclosure.

FIG. 13 is a schematic depiction of a wireless communications system for implementing the present disclosure. FIG. 13 presents a high-level generic server and client interaction for a wireless communications system having a BlackBerry® Enterprise Server (BES) or similar implementation.

The BES will in this implementation act as a routing agent for the "call subject" data package based on available and selected data transmission channels. Alternatively, a scenario where data is pushed directly between two "call subject"-capable devices can also be envisioned.

Figure 14:
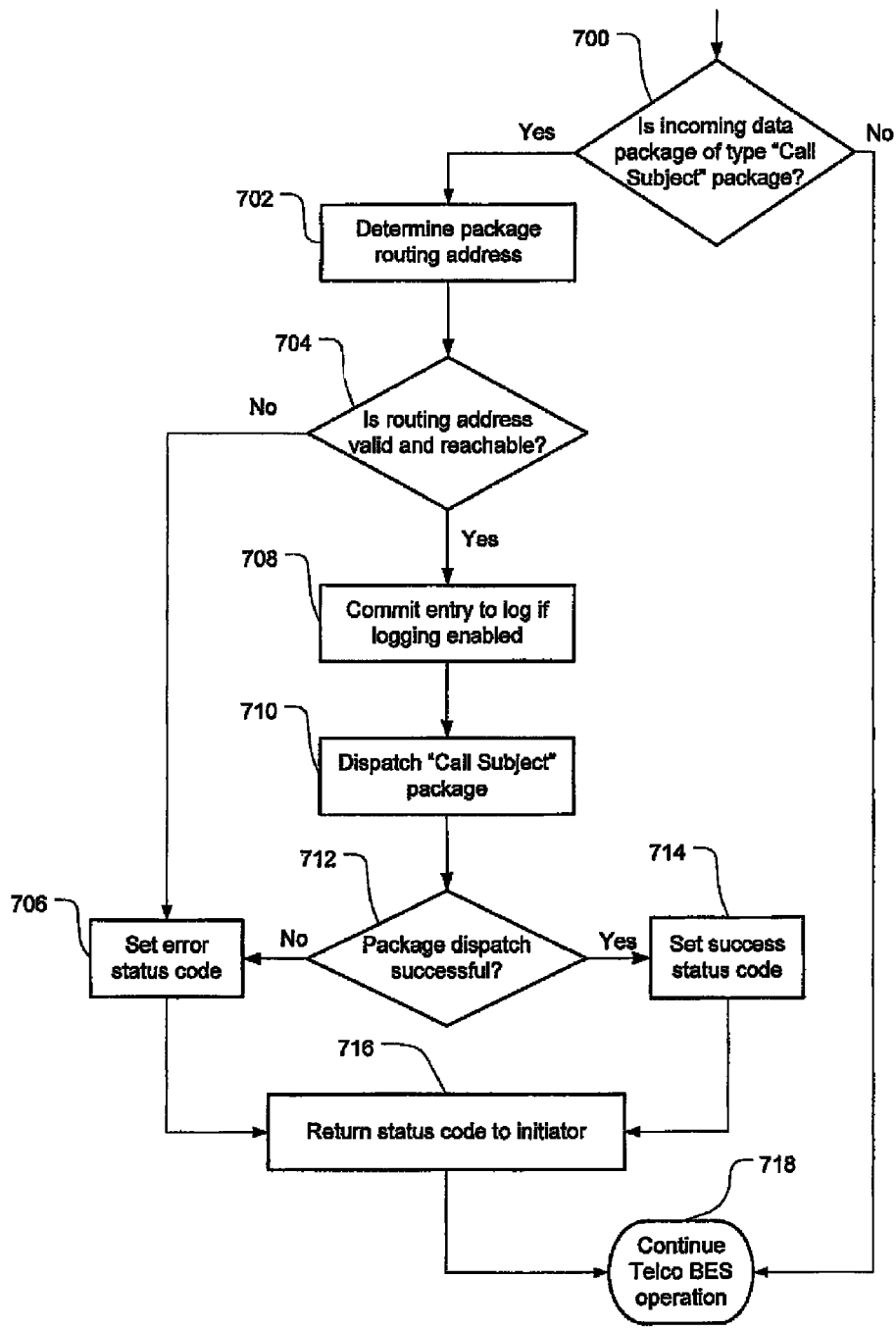
FIG. 14 is a flowchart depicting main steps of routing a call having subject line information.

For the server-side description, with reference also to the flowchart of FIG. 14, what will follow here only describes a generic routing process of the "call subject" data package where the BES is deemed to be the appropriate routing agent based on device capabilities and network availability and selection for data channel transmission.

FIG. 14 is a flowchart depicting main steps of routing a call having subject line information. In the initial step 700 shown in this flowchart, a decision is made as to whether an incoming data package is or is not a "call subject" data package. If the incoming data is not call subject data, then BES operation continues conventionally at step 718 (i.e. operations continue without dispatching any call subject information). On the other hand, if the incoming data is in fact call subject data, then the next step (step 702) is to determine a package routing address and then to determine (step 704) whether the package routing address is valid and reachable. If the routing address is not valid and reachable, then the next step (step 706) is to set an error status code and to return the status code to the initiator (step 716). On the other hand, if the routing address is valid and reachable, the next step (step 708) is to commit the entry to a log (if logging is enabled). Subsequently, in step 710, the "call subject" data package is dispatched to the call recipient. At step 712, it is determined whether the package dispatch was successful. If the package dispatch was successful, then the success status code is set (step 714). If the package dispatch was not successful, then the error status code is not set (step 706). In subsequent step 716, the success status code (or alternatively the error status code) is returned to the initiator address, and then normal BES operation continues at step 718.

In the foregoing examples, the call subject data is transmitted, received, and processed (into intelligible call subject information) in a time frame such that the call subject information is displayed on the display screen of the receiving device approximately contemporaneously with the arrival of the call (and the initial sounding of the ring tone). While this is the most desirable result, it should be appreciated that the call subject information may be displayed slightly before the ring tone begins to sound or slightly after the ring tone has begun to sound.

In a further implementation, the call subject data may be forwarded to a voicemail server in the event that the call is unanswered or in the event that the called party is already on another call. In other words, if the called party has voicemail service, then the call subject data can be forwarded to the voicemail server whereupon it may be accessed by the called party or automatically pushed to the called party as part of a text-based message indicating that the called party has new voice mail. By way of example only, an e-mail may be sent to the called party's wireless communications device with a subject line: "New Voice Mail re: (call subject information)".

This new technology has been described in terms of specific implementations and configurations which are intended to be exemplary only. The scope of the exclusive right sought by the Applicant is therefore intended to be limited solely by the appended claims.

The invention claimed is:

1. A method of establishing a voice call between a caller device and a recipient device, wherein the caller device and the recipient device are connected via a voice channel and a data channel, the method comprising:
  displaying on a display of the caller device a dialing screen of a telephone application for initiating the voice call, the dialing screen including a status bar, a number field located directly below the status bar for receiving a number representing a telephone number to be called, and a text field located directly below the number field, wherein the text field is a call subject field for receiving alphanumeric text representing call subject information;
  in response to receiving call subject information in the call subject field of the dialing screen and in response to receiving an input to initiate the voice call,
  extracting the call subject information from the call subject field;
  determining whether the call subject field was populated by user input or autopopulated by an application;
  displaying a prompt to allow editing of the call subject field when the call subject field was autopopulated by an application;
  transmitting the call subject information to the recipient device over the data channel between the caller device and the recipient device;
  attempting to establish the voice call between the caller device and the recipient device over the voice channel between the caller device and the recipient device approximately contemporaneously with transmitting the call subject information to the recipient device;
  displaying on the display of the caller device a connected call screen in response to the voice call being established, the connected call screen including a status notification indicating that the voice call was established and recipient information including the telephone number called and the call subject information; and
  forwarding the voice call and call subject information from the caller device to a voicemail server in response to the voice call not being established, wherein the voicemail server is configured to send an electronic message to the recipient device upon receipt of the voice call and the call subject information, the electronic message including the call subject information and an indication that an incoming call was missed, wherein the electronic message is an email message and the call subject information is included in a subject line of the email.

2. The method of claim 1, wherein the call subject information is pushed directly from the caller device to the recipient device.

3. A method of establishing a voice call between a caller device and a recipient device, wherein the caller device and the recipient device are connected via a voice channel and a data channel, the method comprising:
  displaying on a display of the caller device an appointment user interface screen of a calendar application, the appointment user interface screen including an invited field populated with a contact name and a subject field populated with a subject;
  in response to receiving input to initiate the voice call while the contact name in the invited field is selected,
  programmatically determining, without user input, a telephone number to be called in accordance with the selected contact name in the invited field from an address book stored on the caller device linked to the calendar application;
  extracting call subject information from the subject field of the appointment user interface screen of the calendar application;

determining whether the extracted call subject information was populated by user input or is autopopulated by an application;
displaying a prompt to allow editing or customization of the extracted call subject information when the extracted call subject information was autopopulated by an application;
transmitting the call subject information to the recipient device over the data channel between the caller device and the recipient device;
attempting to establish the voice call between the caller device and the recipient device over the voice channel between the caller device and the recipient device approximately contemporaneously with transmitting the call subject information to the recipient device;
displaying on the display of the caller device a calling screen for initiating the voice call, the calling screen including a number field with the telephone number being called, and including a call subject field with the call subject information;
displaying on the display of the caller device a connected call screen in response to the voice call being established, the connected call screen including a status notification indicating that the voice call was established, and recipient information including the telephone number called and the call subject information; and
forwarding the voice call and call subject information from the caller device to a voicemail server in response to the voice call not being established, wherein the voicemail server is configured to send an electronic message to the recipient device upon receipt of the voice call and the call subject information, the electronic message including the call subject information and an indication that an incoming call was missed, wherein the electronic message is an email message and the call subject information is included in a subject line of the email.

4. The method of claim 3, wherein the call subject information is pushed directly from the caller device to the recipient device.

5. A method of establishing a voice call between a caller device and a recipient device, wherein the caller device and the recipient device are connected via a voice channel and a data channel, the method comprising:
displaying on a display of the caller device an email message associated with a messaging application, the email message including a subject line populated with a subject and a body populated with text;
in response to receiving input to initiate the voice call while a telephone number in the body of the email message is selected,
extracting call subject information from the subject line of the email message;
determining whether the extracted call subject information was populated by user input or is autopopulated by an application;
displaying a prompt to allow editing or customization of the extracted call subject information when the extracted call subject information was autopopulated by an application;
transmitting the call subject information to the recipient device over the data channel between the caller device and the recipient device;
attempting to establish the voice call between the caller device and the recipient device over the voice channel between the caller device and the recipient device approximately contemporaneously with transmitting the call subject information to the recipient device;
displaying on the display of the caller device a calling screen for initiating the voice call, the calling screen including a number field with the telephone number being called, and including a call subject field with the call subject information;
displaying on the display of the caller device a connected call screen in response to the voice call being established, the connected call screen including a status notification indicating that the voice call was established, and recipient information including the telephone number called and the call subject information; and
forwarding the voice call and call subject information from the caller device to a voicemail server in response to the voice call not being established, wherein the voicemail server is configured to send an electronic message to the recipient device upon receipt of the voice call and the call subject information, the electronic message including the call subject information and an indication that an incoming call was missed, wherein the electronic message is an email message and the call subject information is included in a subject line of the email.

6. The method of claim 5, further comprising:
programmatically determining, without user input, a contact name associated with the telephone number from an address book stored on the caller device linked to the messaging application.

7. The method of claim 5, wherein the call subject information is pushed directly from the caller device to the recipient device.

8. The method of claim 1, further comprising:
receiving user input in the form of alphanumeric text in the call subject field.

* * * * *